(12) United States Patent
Wedderburn, Jr. et al.

(10) Patent No.: US 7,828,091 B2
(45) Date of Patent: Nov. 9, 2010

(54) AIR ELECTRIC VEHICLE

(76) Inventors: Cosburn Henry Wedderburn, Jr., P.O. Box 521, Hanover, MD (US) 21076;
Cosburn Henry Wedderburn, Sr., P.O. Box 407, Reisterstown, MD (US) 21136

( * ) Notice: Subject to any disclaimer, the term of this patent is extended or adjusted under 35 U.S.C. 154(b) by 445 days.

(21) Appl. No.: 12/001,654

(22) Filed: Dec. 12, 2007

(65) Prior Publication Data
US 2009/0301796 A1    Dec. 10, 2009

(51) Int. Cl.
*B60K 16/00* (2006.01)
(52) U.S. Cl. .................. 180/2.2; 180/2.1; 180/65.1
(58) Field of Classification Search ............ 180/2.2, 180/2.1, 165, 65.31, 68.1, 68.2, 65.1; 903/903, 903/960; 290/44, 55
See application file for complete search history.

(56) References Cited

U.S. PATENT DOCUMENTS

| | | | | |
|---|---|---|---|---|
| 4,254,843 A * | 3/1981 | Han et al. | | 180/165 |
| 6,318,781 B1 * | 11/2001 | Mc Kee | | 296/26.09 |
| 6,700,215 B2 * | 3/2004 | Wu | | 290/44 |
| 6,838,782 B2 * | 1/2005 | Vu | | 290/55 |
| 6,897,575 B1 * | 5/2005 | Yu | | 290/44 |
| 7,347,294 B2 * | 3/2008 | Gonzalez | | 180/65.1 |
| 7,434,636 B2 * | 10/2008 | Sutherland | | 180/2.2 |
| 2003/0155464 A1 * | 8/2003 | Tseng | | 244/58 |
| 2003/0209370 A1 * | 11/2003 | Maberry | | 180/2.2 |
| 2006/0113118 A1 * | 6/2006 | Kim | | 180/2.2 |
| 2007/0284155 A1 * | 12/2007 | Cong | | 180/2.2 |

* cited by examiner

*Primary Examiner*—Hau V Phan
(74) *Attorney, Agent, or Firm*—Cosburn Wedderburn, Jr.; Cosburn Wedderburn, Sr.

(57) ABSTRACT

An all electric vehicle that produces zero CO2 emissions and capable of traveling an unlimited amount of mileage is presented. This vehicle is considered air and electric because it uses a wind turbine generator, compressed air and a high voltage battery to generate electricity to power the DC motors that drive this vehicle. Therefore this vehicle is called the Wind Turbine Generator Air Electric Vehicle (WTGAEV). There exists an integrated system that enables this vehicle to maintain a consistent energy supply to automatically recharge the high voltage battery. This integrated system consists of a wind turbine generator (WTG), air motor, air compressor, air tank, and battery. The power train receives its energy from the motion of the vehicle. When the vehicle is in forward motion the air flow from the nose of the vehicle is collected and directed toward the blades of the WTG which generates electric.

12 Claims, 6 Drawing Sheets

Fig. 1 Rush hour system vehicle components

Fig. 4 CCU Central control unit

Fig 5 Wind Turbine Generator and Air motor assembly

AIR ELECTRIC VEHICLE

BACKGROUND OF THE INVENTION

1. Field of the Invention

The present invention relates to an AEV. This AEV contains a system in which the driving wheels are propelled by a DC motor. The DC motor is powered by a WTG and RESS. This WTG typically produces power collected from the air flow when the vehicle is in motion. In driving conditions where the WTG will not experience the necessary airflow to produce enough energy the air motor will torque the shaft of the WTG. This torque of the shaft of the WTG duplicates the condition of airflow when the vehicle is in motion. In turn; power is produced. This AEV is created out of the need to eliminate carbon dioxide emissions and to extend the driving distance to more than 35 miles per gallon as compared to the existing hybrid vehicles. This vehicle presents an environmentally friendly mode of transportation that produces zero carbon dioxide emissions. The emissions in this AEV are completely eliminated by the use of a DC motor, WTG, and air motor assembly. The WTG replaces the combustible engine in that it recharges the batteries and energizes the DC motor. The WTG powers the central control unit (CCU). The CCU accepts energy created by the WTG. The energy in the CCU is redirected to the RESS (battery) and to a DC motor according to the demands of the vehicle. When rush our driving conditions are present the air motor supply's the necessary torque to the shaft of the WTG such that power is produced as a result.

2. Discussion of the Prior Art

For many years great attention has been given to the problem of reduction of fuel consumption of automobiles and other highway vehicles. Concomitantly very substantial attention has been paid to reduction of pollutants emitted by automobiles and other vehicles. To a degree, efforts to solve these problems conflict with one another. For example, increased thermodynamic efficiency and thus reduced fuel consumption can be realized if an engine is operated at higher temperatures. Thus there has been substantial interest in engines built of ceramic materials withstanding higher combustion temperatures than those now in use. However, higher combustion temperatures in gasoline-fueled engines lead to increase in certain undesirable pollutants, typically NO. Another possibility for reducing emissions is to burn mixtures of gasoline and ethanol, or straight ethanol. However, to date ethanol has not become economically competitive with gasoline, and consumers have not accepted ethanol to any great degree. Moreover, to make an alternate fuel such as ethanol available to the extent necessary to achieve appreciable improvements in nationwide air quality and fuel conservation would require immense costs for infrastructure improvements; not only the entire nation's motor fuel production and delivery system, but also the vehicle manufacture, distribution, and repair system, would have to be extensively revised or substantially duplicated. There have been ideas for reducing pollution in cities by limiting the use of vehicles powered by internal combustion engines and instead employ electric vehicles powered by rechargeable batteries. To date, all such "straight electric" cars have had very limited range, typically no more than 150 miles, have insufficient power for acceleration and hill climbing except when the batteries are substantially fully charged, and require substantial time for battery recharging. The latest air vehicles are considered limited in mileage. They typically require the driver to stop periodically at a filler station to add air to the air tanks on the vehicle. Also the idea of rapidly charging batteries is amiss. What would happen if the power grid were unavailable because of a weather storm? Do we stay home because our batteries are not charged? Thus, while there are many circumstances in which the limited range and extended recharging time of the batteries would not be an inconvenience, such cars are not suitable for all the travel requirements of most individuals. Accordingly, an electric car would have to be an additional vehicle for most users, posing a substantial economic deterrent. Moreover, it will be appreciated that in the United States most electricity is generated in coal-fired power plants, so that using electric vehicles merely moves the source of the pollution, but does not eliminate it. Furthermore, comparing the respective net costs per mile of driving, electric vehicles are not competitive with ethanol-fueled vehicles, much less with conventional gasoline-fueled vehicles. See, generally, Simanaitis, "Electric Vehicles", Road & Track, May 1992, pp. 126-136; Reynolds, "AC Propulsion CRX", Road & Track, October 1992, pp. 126-129.

Much attention has also been paid over the years to development of electric vehicles including internal combustion engines powering generators, thus eliminating the defect of limited range exhibited by simple electric vehicles. The simplest such vehicles operate on the same general principle as diesel-electric locomotives used by most railroads. In such systems, an internal combustion engine drives a generator providing electric power to traction motors connected directly to the wheels of the vehicle. This system has the advantage that no variable gear ratio transmission is required between the engine and the wheels of the vehicle. More particularly, an internal combustion engine produces zero torque at zero engine speed (RPM) and reaches its torque peak somewhere in the middle of its operating range. Accordingly, all vehicles driven directly by an internal combustion engine (other than certain single-speed vehicles using friction or centrifugal clutches, and not useful for normal driving) require a variable-ratio transmission between the engine and the wheels, so that the engine's torque can be matched to the road speeds and loads encountered. Further, some sort of clutch must be provided so that the engine can be mechanically decoupled from the wheels, allowing the vehicle to stop while the engine is still running, and to allow some slippage of the engine with respect to the drive train while starting from a stop. It would not be practical to provide a diesel locomotive, for example, with a multiple speed transmission, or a clutch. Accordingly, the additional complexity of the generator and electric traction motors is accepted. Electric traction motors produce full torque at zero RPM and thus can be connected directly to the wheels; when it is desired that the train should accelerate, the diesel engine is simply throttled to increase the generator output and the train begins to move. Typically, the number of diesel locomotives on a train is selected in accordance with the total tonnage to be moved and the grades to be overcome, so that all the locomotives can be operated at nearly full torque production. Moreover, such locomotives tend to be run at steady speeds for long periods of time. Reasonably efficient fuel use is thus achieved. However, such a direct drive vehicle would not achieve good fuel efficiency in typical automotive use, involving many short trips, frequent stops in traffic as well as extended low-speed operation. Another flavor of electric vehicles call "series hybrid" have been proposed for automotive use, wherein batteries are used as energy storage devices, so that an internal combustion engine provided to power a generator can be operated in its most fuel-efficient output power range while still allowing the electric traction motor(s) powering the vehicle to be operated as required. Thus the engine may be loaded by supplying torque to a generator charging the batteries while supplying electrical power to the traction motor(s) as required, so as to operate efficiently. This system overcomes the limitations of electric vehicles noted above with respect to limited range and long recharge times. Thus, as compared to a conventional vehicle, wherein the internal combustion engine delivers torque directly to the wheels, in a series hybrid electric vehicle, torque is delivered from, the engine to the wheels via a serially connected generator used as a battery charger, the battery, and the traction motor. However, energy transfer between those components consumes at least approximately 25% of engine power. Further, such components add substantially to the cost and weight of the vehicle; in particular, an electric motor capable of providing sufficient torque to meet all expected demand, e.g., to allow reasonable performance under acceleration, during hill-climbing and the like, is rather heavy and expensive. Thus, series hybrid vehicles have not been immediately successful. A more promising "parallel hybrid" approach is shown in U.S. Pat. Nos. 3,566,717 and 3,732,751 to Berman et al. In Berman et al an internal combustion engine and an electric motor are matched through a complex gear train so that both can provide torque directly to the wheels, the vehicle being operated in several different modes. Where the output of the internal combustion engine is more than necessary to drive the vehicle ("first mode operation") the engine is run at constant speed and excess power is converted by a first motor/generator ("speeder") to electrical energy for storage in a battery. In "second mode operation", the internal combustion engine drives the wheels directly, and is throttled. When more power is needed than the engine can provide, a second motor/generator or "torquer" provides additional torque as needed. Berman et al thus show two separate electric motor/generators separately powered by the internal combustion engine; the "speeder" charges the batteries, while the "torquer" propels the vehicle forward in traffic. This arrangement is a source of additional complexity, cost and difficulty, as two separate modes of engine control are required. Moreover, the operator must control the transition between the several modes of operation. Such a complex vehicle is unsuited for the automotive market. Automobiles intended for mass production can be no more complicated to operate than conventional vehicles, and must be resistant to damage that might be caused by operator error. Further, the gear train shown by Berman et al appears to be quite complex and difficult to manufacture economically. Berman et al also indicate that one or even two variable-speed transmissions may be required; see, e.g., col. 3, lines 19-22 and 36-38 of U.S. Pat. No. 3,566,717, and col. 2, lines 53-55 of U.S. Pat. No. 3,732,751. Lynch et al U.S. Pat. No. 4,165,795 also shows an early parallel hybrid drive. Lynch argues that maximum fuel efficiency can be realized when a relatively small internal combustion engine is provided, such that when the engine is operated at an efficient speed, it produces approximately the average power required over a typical mission. The example given is of an engine producing 25 hp maximum and 17 hp at its most efficient speed, about 2500 rpm. This is to be combined with an electric motor-generator of about 30 peak hp. This vehicle requires a variable-ratio transmission to achieve reasonable performance. It appears that the engine is to be run continuously, at a steady speed, with additional torque provided by the motor when needed and excess torque produced by the engine being used to charge the batteries. In a first embodiment, torque provided by the motor is transmitted to the drive wheels through the engine, while in a second embodiment their respective positions are reversed.

Nishida U.S. Pat. No. 5,117,931 shows a parallel hybrid vehicle where torque from an electric motor may be combined with torque from an internal combustion engine in a "torque transmission unit" comprising paired bevel gears and means for controlling the relative rates of rotation of the motor and engine, so that the motor can be used to start the engine, absorb excess torque from the engine (by charging a battery), or provide additional propulsive torque. A variable-speed transmission is coupled between the torque transmission unit and the propelling wheels. Both the torque transmission unit and the variable-speed transmission are complex, heavy, and expensive components, the use of which would preferably be avoided.

Helling U.S. Pat. No. 3,923,115 also shows a hybrid vehicle having a torque transmission unit for combining torque from an electric motor and an internal combustion engine. However, in Helling the relative rates of rotation of the motor and engine input shafts are fixed; a flywheel is provided to store excess mechanical energy as well as a battery to store excess electrical energy. Albright, Jr. et al U.S. Pat. No. 4,588,040 shows another hybrid drive scheme using a flywheel in addition to batteries to store excess energy; various complicated mechanical connections are provided between the various components. Capacitors have also been proposed for energy storage; see Bates et al U.S. Pat. No. 5,318,142. Fjallstrom U.S. Pat. No. 5,120,282 shows a parallel hybrid drive train wherein torque from two electric motors is combined with torque produced by an internal combustion engine; the combination is performed by a complex arrangement of paired planetary gear sets, and unspecified control means are alleged to be able to allow variation of road speed without a variable-ratio transmission. Hunt U.S. Pat. Nos. 4,405,029 and 4,470,476 also disclose parallel hybrids requiring complex gearing arrangements, including multiple speed transmissions. More specifically, the Hunt patents disclose several embodiments of parallel hybrid vehicles. Hunt indicates (see col. 4, lines 6-20 of the '476 patent) that an electric motor may drive the vehicle at low speeds up to 20 mph, and an internal combustion engine used for speeds above 20 mph, while "in certain speed ranges, such as from 15-30 mph, both power sources may be energized . . . . Additionally, both power sources could be utilized under heavy load conditions." Hunt also indicates that "the vehicle could be provided with an automatic changeover device which automatically shifts from the electrical power source to the internal combustion power source, depending on the speed of the vehicle" (col. 4, lines 12-16). However, the Hunt vehicle does not meet the objects of the present invention, as discussed in detail below. Hunt's vehicle in each embodiment requires a conventional manual or automatic transmission. See col. 2, lines 6-7. Moreover, the internal combustion engine is connected to the transfer case (wherein torque from the internal combustion engine and electric motor is combined) by a "fluid coupling or torque converter of conventional construction". Col. 2, lines 16-17. Such transmissions and fluid couplings or torque converters are very inefficient, are heavy, bulky, and costly, and are to be eliminated according to one object of the present invention, again as discussed in detail below. Furthermore, the primary means of battery charging disclosed by Hunt involves a further undesirable complexity, namely a turbine driving the electric motor in generator configuration. The turbine is fueled by waste heat from the internal combustion engine. See col. 3, lines 10-60. Hunt's internal combustion engine is also fitted with an alternator, for additional battery charging capability, adding yet further complexity. Thus it is clear that Hunt fails to teach a hybrid vehicle meeting the objects of the present invention—that is, a hybrid vehicle competitive with conventional vehicles with respect to performance, cost and complexity, while achieving substantially improved fuel efficiency.

Kawakatsu U.S. Pat. Nos. 4,305,254 and 4,407,132 show a parallel hybrid involving a single internal combustion engine coupled to the drive wheels through a conventional variable-ratio transmission, an electric motor, and an alternator, to allow efficient use of the internal combustion engine. As in the Hunt disclosure, the engine is intended to be operated in a relatively efficient range of engine speeds; when it produces more torque than is needed to propel the vehicle, the excess is used to charge the batteries; where the engine provides insufficient torque, the motor is energized as well. A further Kawakatsu U.S. Pat. No. 4,335,429, shows a hybrid vehicle, in this case comprising an internal combustion engine and two motor/generator units. A first larger motor/generator, powered by a battery, is used to provide additional torque when that provided by the engine is insufficient; the larger motor-generator also converts excess torque provided by the engine into electrical energy, to be stored by the battery, and is used in a regenerative braking mode. The second smaller motor/generator is similarly used to provide additional torque and additional regenerative braking as needed. More particularly, the latter Kawakatsu patent asserts that a single electric motor sized to provide sufficient torque to propel the vehicle would not be capable of providing sufficient regenerative braking force; see col. 1, line 50-col. 2 lines 8. Accordingly, Kawakatsu provides two separate motor/generators, as noted; a separate engine starting motor is also provided. See col. 6, lines 22-23. In the embodiment shown, the larger motor/generator is connected to the wheel drive shaft, while the engine and the smaller motor/generator are connected to the wheels through a complex mechanism comprising three separately-controllable clutches. See col. 5, lines 50-62. Numerous patents disclose hybrid vehicle drives tending to fall into one or more of the categories discussed above. A number of patents disclose systems wherein an operator is required to select between electric and internal combustion operation; for example, an electric motor is provided for operation inside buildings where exhaust fumes would be dangerous, and an internal combustion engine provided for operation outdoors. It is also known to propose a hybrid vehicle comprising an electric motor for use at low speeds, and an internal combustion engine for use at higher speed. The art also suggests using both when maximum torque is required. In several cases the electric motor drives one set of wheels and the internal combustion engine drives a different set. See generally Shea (U.S. Pat. No. 4,180,138); Fields et al (U.S. Pat. No. 4,351,405); Kenyon (U.S. Pat. No. 4,438,342); Krohling (U.S. Pat. No. 4,593,779); and Eller's (U.S. Pat. No. 4,923,025).

Many of these patents show hybrid vehicle drives wherein a variable speed transmission is required, as do numerous additional references. A transmission as noted above is typically required where the internal combustion engine and/or the electric motor are not capable of supplying sufficient torque at low speeds. See Rosen (U.S. Pat. No. 3,791,473); Rosen (U.S. Pat. No. 4,269,280); Fiala (U.S. Pat. No. 4,400,997); and Wu et al (U.S. Pat. No. 4,697,660). Kinoshita (U.S. Pat. No. 3,970,163) shows a vehicle of this general type wherein a gas turbine engine is coupled to the road wheels through a three-speed transmission; an electric motor is provided to supply additional torque at low speeds. For further examples of series hybrid vehicles generally as discussed above, see Bray (U.S. Pat. No. 4,095,664); Cummings (U.S. Pat. No. 4,148,192); Monaco et al (U.S. Pat. No. 4,306,156); Park (U.S. Pat. No. 4,313,080); McCarthy (U.S. Pat. No. 4,354,144); Heidemeyer (U.S. Pat. No. 4,533,011); Kawamura (U.S. Pat. No. 4,951,769); and Suzuki et al (U.S. Pat. No. 5,053,632). Several of these address specific problems arising in the manufacture or use of hybrid vehicles, or specific alleged design improvements. For Example, Park addresses certain specifics of battery charging and discharge characteristics, while McCarthy shows a complex drive system involving an internal combustion engine driving two electric motors; the torque generated by the latter is combined in a complex differential providing continuously variable gear ratios. Heidemeyer shows connecting an internal combustion engine to an electric motor by a first friction clutch, and connecting the motor to a transmission by a second friction clutch. Other patents of general relevance to this subject matter include Toy (U.S. Pat. No. 3,525,874), showing a series hybrid using a gas turbine as internal combustion engine; Yardney (U.S. Pat. No. 3,650,345), showing use of a compressed-air or similar mechanical starter for the internal combustion engine of a series hybrid, such that batteries of limited current capacity could be used; and Nakamura (U.S. Pat. No. 3,837,419), addressing improvements in thyristor battery-charging and motor drive circuitry. Somewhat further afield but of general interest are the disclosures of Deane (U.S. Pat. No. 3,874,472); Horwinski (U.S. Pat. No. 4,042,056); Yang (U.S. Pat. No. 4,562,894); Keedy (U.S. Pat. No. 4,611,466); and Lexen (U.S. Pat. No. 4,815,334); Mori (U.S. Pat. No. 3,623,568); Grady, Jr. (U.S. Pat. No. 3,454,122); Papst (U.S. Pat. No. 3,211,249); Nims et al (U.S. Pat. No. 2,666,492); and Matsukata (U.S. Pat. No. 3,502,165). Additional references showing parallel hybrid vehicle drive systems include Froelich (U.S. Pat. No. 1,824,014) and Reinbeck (U.S. Pat. No. 3,888,325). U.S. Pat. No. 4,578,955 to Medina shows a hybrid system wherein a gas turbine is used to drive a generator as needed to charge batteries. Of particular interest to certain aspects of the present invention is that Medina discloses that the battery pack should have a voltage in the range of 144, 168 or 216 volts and the generator should deliver current in the range of 400 to 500 amperes. Those of skill in the art will recognize that these high currents involve substantial resistance heating losses, and additionally require that all electrical connections be made by positive mechanical means such as bolts and nuts, or by welding. More specifically, for reasons of safety and in accordance with industry practice, currents in excess of about 50 amperes cannot be carried by the conventional plug-in connectors preferred for reasons of convenience and economy, but must be carried by much heavier, more expensive and less convenient fixed connectors (as used on conventional starter and battery cable connections). Accordingly, it would be desirable to operate the electric motor of a hybrid vehicle at lower currents. U.S. Pat. No. 5,765,656 to Weaver also shows a series hybrid wherein a gas turbine is used as the internal combustion engine; hydrogen is the preferred fuel. U.S. Pat. No. 4,439,989 to Yamakawa shows a system wherein two different internal combustion engines are provided, so that only one need be run when the load is low. This arrangement would be complex and expensive to manufacture. Detailed discussion of various aspects of hybrid vehicle drives may be found in Kalberlah, "Electric Hybrid Drive Systems for Passenger Cars and Taxis", SAE Paper No. 910247 (1991). Kalberlah first compares "straight" electric, series hybrid, and parallel hybrid drive trains, and concludes that parallel hybrids are preferable, at least when intended for general use (that is, straight electric vehicles may be useful under certain narrow conditions of low-speed, limited range urban driving). Kalberlah then compares various forms of parallel hybrids, with respect to his FIG. 4, and concludes that the most practical arrangement is one in which an internal combustion engine drives a first pair of wheels, and an electric motor the second; more particularly, Kalberlah indicates that mechanical combination of the torque from an internal combustion engine and an electric motor is impractical.

Gardner U.S. Pat. Nos. 5,301,764 and 5,346,031 follow Kalberlah's teachings, in that Gardner shows separately driving at least two pairs of wheels; one pair is driven by a first electric motor, and the second by a second electric motor or alternatively by a small internal combustion engine. Three different clutches are provided to allow various sources of drive torque to be connected to the wheels, and to a generator, depending on the vehicle's operation mode. The internal combustion engine is run continuously, and provides the driving torque when the vehicle is in a cruise mode; at other times it is used to charge the batteries powering the electric motors. Bullock, "The Technological Constraints of Mass, Volume, Dynamic Power Range and Energy Capacity on the Viability of Hybrid and Electric Vehicles", SAE Paper No. 891659 (1989) provides a detailed theoretical analysis of electric vehicles in terms of the loads thereon, and a careful analysis of the various battery types then available. Bullock concludes that a vehicle having two electric motors of differing characteristics, driving the wheels through a variable-speed transmission, would be optimal for automotive use; see the discussion of FIG. 8. Bullock also suggests the use of an internal combustion engine to drive battery charging, but does not address combining the engine's torque with that from the motors; see pp. 24-25.

Further related papers are collected in Electric and Hybrid Vehicle Technology, volume SP-915, published by SAE in February 1992. See also Wouk, "Hybrids: Then and Now"; Bates, "On the road with a Ford HEV", and King et al, "Transit Bus takes the Hybrid Route", all in IEEE Spectrum, Vol. 32, 7, (July 1995).

Urban et al U.S. Pat. No. 5,667,029 shows two embodiments of parallel hybrids; a first embodiment is shown in FIGS. 1-9 and 11, and a second in FIGS. 12-17. Both embodiments have numerous common features, including similar operating modes. Referring to the first embodiment, an internal combustion engine provides torque to the road wheels or to a generator; two electric motors can provide torque to the road wheels, or charge batteries during regenerative braking. Torque from the engine and motors is combined at the input shaft to a variable-ratio transmission. Overrunning clutches are provided, e.g., to allow the engine's torque to be applied to the road wheels without also rotating the motors.

As indicated at col. 6, lines 25-54, certain transitions between various operating modes are made automatically, responsive to the position of the accelerator pedal; for example, if the operator does not depress the pedal beyond a given point, only the internal combustion engine is employed to propel the vehicle; if the operator depresses the pedal more fully, the electric motors are also energized. Other changes in the operational mode must be made by the operator directly; for example, the vehicle may be operated as a "straight electric" vehicle, e.g. for short duration trips, by the operator's making an appropriate control action. See col. 7, lines 49-56.

The Urban et al design appears to suffer from a number of significant defects. First, the internal combustion engine is stated to provide all torque needed to accelerate the vehicle to cruising speed under normal circumstances (see col. 5, lines 3-10), and also to propel the vehicle during cruising (see col. 6, lines 48-54). The electric motors are to be used only during rapid acceleration and hill-climbing; col. 5, lines 10-13. A 20 horsepower engine, operated through a continuously variable-ratio transmission and a torque converter, is stated to be adequate for this purpose. Such components are clearly complex and expensive; further, torque converters are notoriously inefficient. Moreover, using the internal combustion engine as the sole source of power for low-speed running would require it to be run at low speeds, e.g., at traffic lights, which is very inefficient and highly polluting. (Various additional references suggest that excess torque can be used to charge batteries; if this were incorporated in the Urban system, the engine might be run at a reasonably efficient output level while the vehicle was stationary, but this would lead to high levels of noise and vibration. In any event Urban does not appear to consider this possibility.) On the other hand, Urban does suggest that the vehicle can be operated as a "straight electric" under low-speed conditions, but this requires the operator to provide an explicit control input; this complexity is unacceptable in a vehicle intended to be sold in quantity, as would be required in order to reach Urban's stated goals of reduction of atmospheric pollution and reduced energy consumption. As noted, hybrid vehicle operation must be essentially "foolproof", or "transparent" to the user, to have any chance of commercial success. Urban's second embodiment is mechanically simpler, employing but a single "dynamotor", through which torque is transmitted from the engine to the variable-ratio transmission, but suffers from the same operational deficiencies. A second Urban et al patent, U.S. Pat. No. 5,704,440, is directed to the method of operation of the vehicle of the '029 patent and suffers the same inadequacies. Various articles describe several generations of Toyota Motor Company hybrid vehicles, believed to correspond to that available commercially as the "Prius". See, for example, Yamaguchi, "Toyota readies gasoline/electric hybrid system", Automotive Engineering, July 1997, pp. 55-58; Wilson, "Not Electric, Not Gasoline, But Both", Autoweek, Jun. 2, 1997, pp. 17-18; Bulgin, "The Future Works, Quietly", Autoweek Feb. 23, 1998, pp. 12 and 13; and "Toyota Electric and Hybrid Vehicles", a Toyota brochure. A more detailed discussion of the Toyota vehicle's powertrain is found in Nagasaka et al, "Development of the Hybrid/Battery ECU for the Toyota Hybrid System", SAE paper 981122 (1998), pp. 19-27. According to the Wilson article, Toyota describes this vehicle as a "series-parallel hybrid"; regardless of the label applied, its powertrain appears to be similar to that of the Berman patents described above, that is, torque from either or both of an internal combustion engine and an electric motor are controllably combined in a "power-split mechanism" and transmitted to the drive wheels through a planetary gearset providing the functionality of a variable-ratio transmission. See the Nagasaka article at pp. 19-20. Furutani U.S. Pat. No. 5,495,906 describes a vehicle having an internal combustion engine driving a first set of wheels through a variable-ratio transmission and an electric motor driving a second set of wheels. The engine is apparently intended to be run continuously; at low speeds, it drives a generator to charge batteries providing energy to the motor and at higher speeds the engine or both engine and motor propel the vehicle. In some circumstances the transmission may not be required; compare, for example, col. 3, lines 4-8 with col. 5, lines 59-64.

U.S. Pat. No. 5,842,534 to Frank shows a "charge depletion" control method for hybrid vehicles; in this scheme, the internal combustion engine is essentially used only when the state of the batteries is such that the vehicle cannot otherwise reach a recharging point. See col. 3, lines 50-55. In normal operation, the batteries are recharged from an external power source. Frank also discusses two-mode brake pedal operation, wherein mechanical brakes are engaged in addition to regenerative braking when the pedal is depressed beyond a preset point.

U.S. Pat. No. 5,823,280 to Lateur et al shows a parallel hybrid wherein the shafts of an internal combustion engine and first and second electric motors are all coaxial; the engine is connected to the first motor by a clutch, and the first motor to the second by a planetary gear set, allowing the speeds of the motors to be varied so as to operate them in their most efficient range. See col. 4, line 57-col. 5, and line 60.

U.S. Pat. No. 5,826,671 to Nakae et al shows a parallel hybrid wherein torque from an internal combustion engine is combined with that from a motor in a planetary gear set; a clutch is provided there between. The specific invention relates to sensing of engine warm-up conditions, so as to limit emission of unburned fuel and thus lower emissions.

U.S. Pat. No. 5,846,155 to Taniguchi et al shows a parallel hybrid wherein torque from an internal combustion engine and a motor is again combined in a planetary gear set; the specific improvement appears to be the use of a continuously-variable transmission. It will be appreciated by those of skill in the art that there are significant limitations inherent in the use of planetary gear sets as a means for connecting different sources, e.g., an internal combustion engine and an electric motor, to the drive wheels of a vehicle, namely, that unless the planetary gear set is effectively locked (anathematic to its use as a continuously-variable transmission, e.g., in the Toyota vehicle) it is capable of additive combination of shaft speeds, but not of output torque. Hence, the principal advantage of the parallel hybrid drivetrain, additive combination of the output torque of both the electric motor and the internal combustion engine, is only available when the planetary gear set is locked. This fact is acknowledged by Lateur, for example, at col. 6, line 27. Additional disclosures of possible interest include U.S. Pat. No. 5,845,731 to Buglione et al; this patent issued Dec. 8, 1998, and therefore is not necessarily available as a reference against the claims of the present application. The basic powertrain shown by Buglione et al includes an internal combustion engine 12, coupled through a first clutch 18 to a first electric motor 20, coupled to a second electric motor 26 through a second clutch 24; the wheels are (apparently; see col. 3, line 8) driven by the second motor 26. The overall hybrid operational scheme provided by Buglione et al is illustrated in FIG. 4. At low speeds one or both motors may be used to propel the vehicle, with the engine off, idling, or running to drive one motor as a generator. During low-speed cruising the second motor propels the vehicle, while during high-speed cruising, the engine propels the vehicle. When acceleration is required at high speed, the engine and both motors may be used to propel the vehicle. Buglione et al also indicates that a variable-ratio transmission may be unnecessary, col. 3, line 9, and that the first motor can be used to start the engine, col. 4, lines 8-15.

U.S. Pat. No. 5,586,613 to Ehsani, showing an "electrically peaking hybrid" vehicle is also of interest Ehsani's vehicle is shown in several embodiments; in each, an engine is apparently to be run continuously, with excess torque used to charge the batteries, and one or more motors used to provide additional propulsive torque when the engine's output torque is inadequate. A transmission is provided in some embodiments of the Ehsani vehicle. An embodiment involving two motors is shown in FIG. 7, and can be modified as discussed in the text at col. 9, lines 4-5. FIG. 7 itself shows driving a first set of wheels by a first "electric machine", i.e., a motor capable of operation as a generator. This drive arrangement is independent of a second drive arrangement, whereby a second set of wheels is driven by an engine connected through a first clutch to a second electric machine, connected to the second set of wheels by a second clutch. Ehsani suggests at col. 9, lines 4-5 that the drive shaft otherwise coupled to the first electric machine could also be driven by the engine. Although it is not made explicit that the first electric machine is to be retained, this seems likely; otherwise, the modified FIG. 7 embodiment would be the same as Ehsani's FIG. 1, modified to have all four wheels driven by a common driveshaft. This application discloses a number of improvements over and enhancements to the hybrid vehicles disclosed in U.S. Pat. No. 5,343,970 (the "'970 patent"), to one of the present inventors, which is incorporated herein by this reference. Where differences are not mentioned, it is to be understood that the specifics of the vehicle design shown in the '970 patent are applicable to the vehicles shown herein as well. Discussion of the '970 patent herein is not to be construed to limit the scope of its claims. Generally speaking, the '970 patent discloses hybrid vehicles wherein a controllable torque transfer unit is provided capable of transferring torque between an internal combustion engine, an electric motor, and the drive wheels of the vehicle. The direction of torque transfer is controlled by a microprocessor responsive to the mode of operation of the vehicle, to provide highly efficient operation over a wide variety of operating conditions, and while providing good performance. The flow of energy—either electrical energy stored in a substantial battery bank, or chemical energy stored as combustible fuel—is similarly controlled by the microprocessor. For example, according to the operating scheme of the hybrid vehicle disclosed in the '970 patent, in low-speed city driving, the electric motor provides all torque needed responsive to energy flowing from the battery. In high-speed highway driving, where the internal-combustion engine can be operated efficiently, it typically provides all torque; additional torque may be provided by the electric motor as needed for acceleration, hill-climbing, or passing. The electric motor is also used to start the internal-combustion engine, and can be operated as a generator by appropriate connection of its windings by a solid-state, microprocessor-controlled inverter. For example, when the state of charge of the battery bank is relatively depleted, e.g., after a lengthy period of battery-only operation in city traffic, the internal combustion engine is started and drives the motor at between 50 and 100% of its maximum torque output, for efficient charging of the battery bank. Similarly, during braking or hill descent, the kinetic energy of the vehicle can be turned into stored electrical energy by regenerative braking.

The hybrid drive train shown in the '970 patent has many advantages with respect to the prior art which are retained by the present invention. For example, the electric drive motor is selected to be of relatively high power, specifically, equal to or greater than that of the internal combustion engine, and to have high torque output characteristics at low speeds; this allows the conventional multi-speed vehicle transmission to be eliminated. As compared to the prior art, the battery bank, motor/generator, and associated power circuitry are operated at relatively high voltage and relatively low current, reducing losses due to resistive heating and simplifying component selection and connection. It can thus be seen that while the prior art, including the '970 patent, clearly discloses the desirability of operating an internal combustion engine in its most efficient operating range, and that a battery may be provided to store energy to be supplied to an electric motor in order to even out the load on the internal combustion engine, there remains substantial room for improvement. In particular, it is desired to obtain the operational flexibility of a parallel hybrid system, while optimizing the systems operational parameters and providing a substantially simplified parallel hybrid system as compared to those shown in the prior art, again as including the '970 patent. As noted above, the present application is a continuation-in-part of Ser. No. 09/264,817, filed Mar. 9, 1999 (the '817 application), which discloses and claims several distinct improvements over the hybrid vehicles shown in the '970 patent, as discussed in further detail below. Similarly, the present application is a continuation-in-part of Ser. No. 09/392,743, filed Sep. 9, 1999 (the '743 application), which discloses and claims several distinct improvements over the hybrid vehicles shown in the '970 patent and the '817 application, as discussed in further detail below. The present application discloses and claims further improvements over the vehicles of the '817 and '743 applications. As discussed in detail below, the '817 and '743 applications (which are not to be limited by this brief summary) disclose a new "topology" for a hybrid vehicle, wherein an internal combustion engine and a first electric "starting" motor, which can be operated as a starter, to start the engine, a generator, to charge the battery bank responsive to torque from the engine or the wheels (i.e., during regenerative braking) or as a source of torque, to propel the vehicle, are connected to the road wheels of the vehicle through a clutch, so that the engine can be decoupled from the wheels during starting and battery charging, but can be connected to the wheels to propel the vehicle. A second "traction" motor is directly connected to the road wheels to propel the vehicle. The vehicle operating mode is determined by a microprocessor responsive to the "road load", that is, the vehicle's instantaneous torque demands. The '743 application further discloses that a turbocharger may be provided, and operated when needed to increase the torque output of the engine when torque in excess of its normally-aspirated capacity is required for more than a minimum time. The present application builds further on these concepts. Koide U.S. Pat. No. 5,934,395 and Schmidt-Brucken U.S. Pat. No. 6,059,059 were addressed during the prosecution of the '817 application. Tsuzuki U.S. Pat. No. 6,018,198 and Werson U.S. Pat. No. 5,986,376 were also each applied against one claim. As indicated, the '817 application discloses a hybrid vehicle comprising a controller, a battery bank, an internal combustion engine, and two electric motors, a starting motor and a traction motor. The starting motor and engine are connected to the road wheels through a clutch, while the traction motor is connected directly and permanently to the road wheels for torque transmission there between, i.e., without a clutch there between. Koide does not show this "topology" for a hybrid vehicle; although Koide does show a hybrid vehicle having first and second motors along with an engine, the components are not connected as described. Specifically, in Koide, both motors and the engine are connected to the road wheels by way of a variable-ratio transmission and a clutch, while, as noted, in the '817 application only the combination of the engine and starting motor is connected to the wheels through a clutch, while the traction motor is connected directly to the wheels for torque transmission there between, that is, without a clutch or variable-ratio transmission. More specifically, Koide's entire disclosure is premised on being able to vary the ratios between the torque-producing components of his system and the road wheels, in order that the engine can be smoothly started when needed. According to the '817 application, only the starter motor and engine need to be disconnectable from the wheels for smooth starting, while the traction motor can be connected to the road wheels at all times. This represents a substantial simplification with respect to the system shown by Koide.

The Schmidt-Brucken patent also fails to show the topology shown in the '817 application. Schmidt-Brucken shows an engine 1 in combination with a starting motor 7, connected to the road wheels through a first clutch 11, and a traction motor 19 connected to the road wheels through a second clutch 23. The '817 and '743 applications also disclose that the vehicle operating mode is determined by a microprocessor responsive to the "road load", that is, the vehicle's instantaneous torque demands, i.e., that amount of torque required to propel the vehicle at a desired speed. The operator's input, by way of the accelerator or brake pedals, or a "cruise control" device, indicates that continuing at steady speed is desired, or that a change in vehicle speed is called for. For example, the operator's depressing the accelerator pedal signifies an increase in desired speed, i.e., an increase in road load, while reducing the pressure on the accelerator or depressing the brake pedal signifies a desired reduction in vehicle speed, indicating that the torque being supplied is to be reduced or should be negative. More particularly, it is important to note that the road load can vary between wide limits, independent of vehicle speed, and can be positive or negative, i.e., when decelerating or descending a hill, in which case the negative road load (that is, torque available at the wheels in excess of that required to propel the vehicle) is usually employed to charge the battery bank. More particularly, it is important to recognize that road load is not the same thing as vehicle velocity. Indeed, as noted, road load can be negative while vehicle velocity is positive, as during deceleration or descent. Moreover, widely differing road loads may be encountered during operation at the same velocity; for example, operation at 50 mph on a flat road may involve a road load of only 30-40% of the engine's maximum output torque, while accelerating from the same speed while climbing a hill may involve a road load of well over 100% of maximum output torque. By the same token, control of the vehicle's operating mode in response to monitoring of road load is not the same as controlling its operating mode in response to vehicle speed. Numerous prior art references, including the Koide and Schmidt-Brucken patents, teach. the latter, i.e., indicate the vehicle operating mode should be controlled in response to vehicle speed. See Koide at col. 12, lines 45-48, and Schmidt-Brucken at col. 5, line 56-col. 6 lines 29. Neither Koide nor Schmidt-Brucken, nor any other reference of which the inventors are aware, recognizes that the desired vehicle operational mode should preferably be controlled in response to the vehicle's actual torque requirements, i.e., the road load. Doing so according to the invention provides superior performance, in terms of both vehicle response to operator commands and fuel efficiency, under the widely-varying conditions encountered in "real world" driving situations, than is possible according to the prior art. Moreover, as set forth in the '817 and '743 applications, in order to provide maximum efficiency in use of fuel, it is essential to operate the internal combustion engine of a hybrid vehicle only under circumstances where the engine will be loaded so as to require at least 30% of its maximum torque output ("MTO") (it being understood throughout this specification and the appended claims that this 30% figure is arbitrary and can be varied). If the vehicle is controlled to shift into an engine-only mode whenever it exceeds some arbitrary road speed, as in Koide and Schmidt-Brucken, it is apparent that the engine will be operated at various times when the road load is less than 30% of MTO, for example, during deceleration or during descents. Moreover, as noted above, the torque actually required can vary widely irrespective of vehicle speed. For example, 30% of MTO may be sufficient to maintain steady speed on a flat road, but 150% of MTO may be required for acceleration from the same speed. If the vehicle's operational mode is selected based solely on speed, as taught by Koide and Schmidt-Brucken, it will be incapable of responding to the operator's commands, and will ultimately be unsatisfactory.

By comparison, according to the invention of the '817 and '743 applications, and as further disclosed and claimed herein, the vehicle's operating mode—that is, the selection of the source of torque needed to propel the vehicle—is determined based on the amount of torque actually required. In this way the proper combination of engine, traction motor, and starting motor is always available. This apparently-simple point has evidently been missed entirely by the art. Moreover, according to this aspect of the invention, the engine is used to propel the vehicle only when it is efficient to do so. This is in accordance with another aspect of the invention, wherein the engine is operated only at high efficiency, leading directly to improved fuel economy. For example, the engine is also used as needed to charge the battery bank, e.g., in low-speed city driving, where the battery bank may become depleted. The starter motor, which is operated as a generator in these circumstances, is accordingly sized so as be able to accept at least 30% of MTO as input torque; the battery bank is likewise sized so as to be able to accept a corresponding amount of charging current. Therefore the engine is never operated at less than 30% of MTO, and is thus never operated inefficiently. Koide and Schmidt-Brucken, because they teach switching the vehicle's operational mode based on vehicle speed and not its torque requirements, would inherently operate the engine under less efficient conditions.

Furutani U.S. Pat. No. 5,495,906 discloses selection of operating mode based on a combination of vehicle speed and "vehicle load"; see, e.g., col. 2, lines 39-47: "It is preferable that the running state detection means detects vehicle speed and vehicle load . . . [and] that the control means transfers the driving force generated by the engine to the power generator and changes the electric power generated by the power generator [i.e., more of the engine power is used to charge the batteries] in accordance with the vehicle load if the vehicle speed is the predetermined value or less. Moreover, it is preferable to change the predetermined value of the vehicle speed in accordance with the vehicle load." It thus appears that Furutani determines the vehicle operating state based on vehicle speed, although the change-over speed can be varied responsive to the vehicle load. Furutani's "vehicle load" thus apparently includes the torque required to charge the battery, as distinguished from applicants' "road load", i.e., the torque required to propel the vehicle. Even assuming that Furutani's "vehicle load", which is not defined, were suggestive of "road load" as used by applicants, Furutani clearly does not suggest determining the operating mode based on road load. More specifically, although Furutani recognizes a distinction between differing vehicle loads, and that the vehicle load can vary independent of vehicle speed, the vehicle operating mode is nonetheless selected based on vehicle speed; see col. 3, line 62-col. 4, line 32. Instead of varying the operating mode of the vehicle based on road load, Furutani directs more or less of the engine's torque to battery charging; see col. 4, lines 24-32. Frank U.S. Pat. No. 6,054,844 shows several embodiments of hybrid vehicles. In those where an engine is used to provide torque to the vehicle wheels, a continuously-variable transmission is employed, and the ratio R is considered in determining the response to be made to operator input, e.g., accelerator and brake pedal positions. Frank's control strategy is to operate the engine along a line of optimal efficiency and use an electric motor to add to or subtract from the engine's output torque as appropriate. See col. 6, line 49-col. 7, line 7 and col. 10, line 33-col. 11, line 22. Frank thus does not suggest control of the vehicle operating mode responsive to road load.

U.S. Pat. No. 6,018,694 to Egami et al shows a controller for a hybrid vehicle comprising an internal combustion engine and first and second "rotary electric units". Although the question is not free from doubt, it appears from a detailed review of Egami's disclosure that torque from the engine is not supplied directly to the road wheels, but instead is used to drive one of the rotary electric units as a generator, in turn supplying the second with current to provide torque for propelling the vehicle. Hence Egami does not show selection of the operational mode of the vehicle (that is, the determination whether propulsive torque is to be provided from the engine, one or both of the motors, or all three) in response to the road load, since it does not appear that propulsive torque is ever supplied from the engine to the wheels. Moreover, despite making reference to a "vehicle driving torque demand Mv*", which might be misunderstood to be equivalent to applicant's road load, Egami in fact does not determine the road load. More specifically, Mv* is determined by consulting a "map", using "the vehicle speed V, the accelerator lift ACC, the brake state BRK, and the shift position SFT as the input parameters". See col. 22, lines 23-26. The same point, i.e., that the "vehicle driving torque demand Mv*" is not equivalent to applicant's claimed road load, is made throughout Egami's extensive specification; see, for example, col. 10, lines 28-32 and col. 27, lines 58-65.

Deguchi U.S. Pat. No. 5,993,351 refers to decision-making regarding the vehicle mode of operation "based on the vehicle speed detected value and the required motive force detected value" (Abstract; see also col. 1, line 41); the latter might be misunderstood to be equivalent to the road load. Deguchi also states (col. 2, lines 7-9) that the vehicle "runs on the motor at times of low load and runs on the internal combustion engine at times of high load". However, Deguchi makes it clear that in fact the operational-mode decision is made "based on the accelerator aperture detected value theta.

which represents the required driving force of the vehicle and the detected vehicle speed" (col. 5, lines 19-21). The accelerator position and vehicle speed signals are the only relevant inputs to the vehicle controller shown in FIG. 2. Hence Deguchi does not show controlling the vehicle operating mode responsive to road load as defined by applicants.

Along similar lines, Boll U.S. Pat. No. 5,327,992 teaches a hybrid vehicle comprising a diesel engine and a motor on a common shaft, and intended to be operated such that the engine is only operated efficiently, i.e., under relatively high load. The torque required to overcome the "instantaneous tractive resistance" is determined responsive to the deflection of the accelerator pedal, i.e., in response to operator command (see col. 3, line 13 and line 35); when this is less than the minimum amount of torque that can be produced efficiently by the engine, the excess torque is used to power the motor as a generator. Boll also suggests that both the motor and engine can be used to propel the vehicle when needed, e.g., during acceleration, and that the vehicle can be operated in four different modes: (a) engine alone powering the vehicle; (b) motor only powering the vehicle, with the engine "generally switched off"; (c) engine and motor both powering the vehicle; and (d) engine powering vehicle, with excess torque powering motor in generator mode. Boll also teaches that a second motor can be provided, operable as a generator and then driven either by the engine directly or by exhaust gas, and that the resulting current can be used to charge the battery or to power the other motor. Other references of interest are directed to the braking systems of hybrid vehicles, see for example German patent 19 05 641 to Strifler, discussing a method of control of a braking system providing both regenerative and mechanical braking, and the powering of ancillary systems, such as power steering pumps, see U.S. Pat. No. 5,249,637 to Heidl.

Substantial attention has been paid to reduction of pollutants emitted by automobiles and other commuter vehicles. There are many attempts of reducing the pollutants in the atmosphere by reducing the fuel consumption used by automobiles and other highway commuter vehicles. There have also been suggestions of using alternative fuels such as burning mixtures of gasoline and ethanol or pure ethanol. This would be a start at reducing emissions; however the cost of converting the existing fuel infrastructure would outweigh gaining public interest and confidence. One proposal for reducing pollution in cities is to limit the use of vehicles powered by internal combustion engines and instead employ electric vehicles powered by rechargeable batteries. To date, most straight electric vehicles, require substantial time for battery recharging, have insufficient power for hill climbing and acceleration except when the batteries are fully charged and have had very limited range; typically no more than 150 miles. This latent defect of limited mileage was eliminated with hybrid electric vehicles that incorporated some form of internal combustion engine to power a generator function in conjunction with an electric motor.

The attempts of creating series hybrid electric vehicle for automotive use to reduce emissions has been suggested, but again this type of hybrid vehicle also uses some form of a combustible engine to power a generator which emits pollutants. Even the more promising parallel hybrid vehicle or the series-parallel vehicles known as Toyota Prius employs an internal combustion engine in conjunction with an electric motor emits carbon dioxide when the combustible engine functions to drive or generate power. There have been numerous patents above that disclose various hybrid vehicle drives tending to fall into one or more of the categories of either a series or parallel hybrid vehicle. It is obvious to anyone that there are many variations of the hybrid vehicle. These variations range from having a torque transmission unit for combining torque to the drive wheels, to a parallel hybrid drive train wherein torque from two electric motors is combined; to series-parallel hybrid vehicles, to complex gearing arrangements, including multiple speed transmissions. These variations in HEVs are all made with an attempt at reducing carbon dioxide emissions and increase fuel economy by employing a combustible engine that propels the vehicle in certain situations or part time. As long as there is a combustible engine that functions in any situation of any vehicle, carbon dioxide emissions will never be fully eliminated. Furthermore, the existing hybrid vehicles have not been immediately successful at reducing greenhouse emissions completely.

OBJECT THE INVENTION

An improvement to the existing HEVs known as the WTGAEV (Wind Turbine Generator Air Electric Vehicle) is discussed below. The WTGAEV completely eliminates CO2 exhaust simply because there is no combustible engine employed to drive the vehicle or generate power to the RESS (rechargeable energy storage system). More specifically it is an object of this invention to eliminate carbon dioxide emissions in commuter automobiles by presenting this WTGAEV. The WTGAEV is more environmentally friendly than the existing hybrid electric vehicle where as the combustible engine is replaced by a WTG. The AEV is comprised of an electric motor and a Rechargeable Energy Storage System (RESS) that is recharged by the WTG, air compressor, air tank, and an air motor. The WTG serves as the power source that will charge the batteries (RESS) as well as supply power to the DC motor. The DC motor will supply torque to the drive wheels. The wind turbine generator is torqued by a propeller blade connected to the shaft of the WTG and or the air motor in series. The wind is collected from an air deflector. The opening of the air deflector will consist of a mouth that is fixed to the grill of all such vehicles to collect the air flow. The rear opening of the duct will house the propeller blades of the WTG. The deflector will be positioned in the direction of the vehicle will move such that the mouth of the deflector will collect the maximum amount of air flow. The WTG replaces the combustible engine in that the WTG functions as the energy source. The WTG also supply and maintain a portion of energy to the RESS. The other portion of energy will be reserved for supplying energy to the DC motor. It is also a further object of the invention to overcome the biggest obstacles facing electric vehicles which is the inability to store enough electricity in a light weight package to travel as far as ice powered vehicles, inability to be able to recharge as fast as filling up at a gas station, and the lack of driving distance before "stopping to fill up". The invention of the WTGAEV overcomes these latter mentioned obstacles in that there is no concern about the recharging at a fill station because the WTG charges the batteries as the vehicle moves. When the vehicle is in rush hour traffic (stop start traffic); the air flow to the WTG is stopped. The air motor that is connected to the shaft of the WTG through a series of belts and gears will torque the WTG to produce sufficient energy to charge the RESS as well as power the DC motor. Therefore it can be suggested that the WTGAEV has unlimited mileage. The WTG supply's continuous energy to the batteries which can further decrease the size of batteries since simultaneous charging will occur while driving the vehicle. The size of the batteries can be reduced or enlarged according to the payload of the particular vehicle size, weight and use.

It is an object of the invention to eliminate the pollution caused by the combustible engine as the engine is running while the vehicle is idle. The WTGAEV can remain idle while producing zero carbon dioxide emissions. The DC motors as well as the batteries coupled with the WTG allow the vehicle to function as a 100% clean automobile. There is no combustible engine emitting CO2 that needs to be mechanically decoupled from the wheels to allow the vehicle to stop while the engine is still running. It is also an object of this invention to overcome the limitations of straight electric vehicles with respect to limited range of 150 miles. The range of the existing vehicles is limited because the battery power is required by the DC motors. The motors typically deplete the battery. The batteries will require recharging by some combustible engine that negatively impacts the environment. The WTGAEV solves this latent problem by using the WTG to simultaneously supply energy to the DC motor while charging the RESS. The WTG will supply a continuous voltage as long as the vehicle is in continuous motion. If the vehicle is in stop-start traffic, the air compressor becomes energized to stabilize the air tank. The air motor becomes active necessarily to torque the WTG. The torque of the WTG duplicates the condition of the vehicle in continuous motion. The WTG will provide the necessary power to the DC motors and RESS. It is also an object of this invention to overcome the limitations of long recharge times and limited road trips. The WTG supply's a continuous voltage to maintain the voltage level of the batteries. Therefore long road trips will not be a problem since the WTGAEV charges while the vehicle drives. It is also an objective of this invention to address the idea of moving the source of pollution. It is believed that the existing electric vehicles move the source of the pollution because the electricity generated in coal-fired power plants is used to charge the batteries of said vehicles. The WTGAEV contains its own source of energy as well as a mechanism for generation electric. This mechanism is the WTG. Therefore the source of the pollution with regards to creating electricity is eliminated.

SUMMARY OF THE INVENTION

With a view to attaining the object, according to a first aspect of the invention, there is proposed an AEV comprising a wind turbine generator operable to charge the RESS, supply energy to the drive DC motor, and supply energy to the control unit. In addition the AEV will contain an air deflector that will collect and deflect the air flow toward the blades of the WTG. In driving conditions where the air flow is restricted the air motor will torque the shaft of the WTG. There will be a first electric DC motor operable to propel the air electric vehicle (AEV) by providing torque to one or more of the driving wheels. The second electric DC motor will be operable to increase the velocity of the vehicle in aggressive driving situations by supplying more torque to the second pair of driving wheels. The power-train of this AEV will consist of a battery coupled to the first and or second electric motors operable to provide current to the electric DC motor, and accept current from the WTG. There is an air compressor that will power on to maintain the air pressure in the air tank. The air tank, AT1~3 will supply air to the air motor. There is an air motor used to torque the WTG in driving conditions where air flow is minimal. The WTG and RESS will distribute the power to the DC motors that accept instructions from the accelerator. The rheostat serves to increase or decrease the velocity of the vehicle. The rheostat that will be used to accelerate the vehicle by increasing the amount of voltage that the DC motor will use based on the desired speed and traction. The break-pedal that is used by the AEV consists of a momentary switch that will interrupt the connection between the source voltages that supplies the DC motor. In addition, according to a second aspect of the invention, An AEV as set forth in the first aspect of the invention, wherein the first DC motor will torque to the driving wheels at low-speed and the second DC motor will torque the second set of wheels when more acceleration is needed. According to the construction, the performance can be enhanced sufficiently by increasing the resistance in the rheostat which will effectively increase the voltage to the first DC motor and or second DC motor as demanded. In addition, according to the third aspect of the invention, an AEV as set forth in the second aspect of the invention, the first DC motor and second DC motors are energized by the CCU that is powered by the WTG or powered directly from the batteries (RESS). According to the construction, the first and second DC motors can be energized by the WTG if a situation occurs where the battery is depleted and the air motor will torque the WTG and in turn restore energy to the RESS. In addition, according to the fourth aspect of the invention, an AEV as set forth in the third aspect of the invention, the velocity of the DC motors is controlled by an accelerator pedal. According to the construction, the accelerator consists of a rheostat to vary the potential seen by the DC motor. When the resistance of the rheostat is adjusted to increase the resistance the second DC motor will be enabled to supply additional amount of torque. In addition, according to the fifth aspect of the invention, an AEV as set forth in the forth aspect of the invention, the accelerator pedal consists of a rheostat that varies the supply power to the DC motor; the break-pedal will interrupt the connection between the WTG and the RESS and the DC motor. According to the construction, the above mentioned mechanism makes use of an efficient way to prevent the battery from being loaded if the vehicle is idle. In addition, according to the sixth aspect of the invention, an AEV as set forth in the first aspect of the invention, the WTG replaces the combustible engine in the prior art by charging the RESS and or supplying energy to the CCU that will control the connection to the DC motors.

According to the construction, the WTG is the main power source in the AEV. The WTG is positioned at the rear of an air deflector to collect the maximum amount of air to increase the shaft velocity of the WTG. The output voltage of the WTG is a function of wind velocity. The goal is to maintain a situation where the battery realizes a constant charging; additional voltage not absorbed by the RESS is distributed out for powering the DC motors. In addition, according to the seventh aspect of the invention, an AEV as set forth in the sixth aspect of the invention, the RESS consists of a series of high voltage batteries conducted to create one high voltage battery pack. The battery will accept a constant charge from the WTG until that battery reaches the maximum charge. According to the construction, the system is also designed such that the WTG serves as a voltage source in addition to the battery when additional power is needed. In addition, according to the eighth aspect of the invention, an AEV as set forth in the third aspect of the invention, the CCU will provide a direct supply of power to the DC motor from the WTG or from the most maximum charged battery.

According to the construction, the CCU will accept and distribute the necessary amount of voltages as needed when the demands of the vehicle are present. In addition, according to the ninth aspect of the invention, an AEV as set forth in the first aspect of the invention, the WTG will collect a maximum amount of air flow from the deflector to maximize the propeller speed of the WTG.

According to the construction, the air deflector can be situated in the front of the vehicle or underneath of the body of the vehicle. At either instance the air deflector is sized to deflect the maximum amount of air flow toward the blades in order to increase the revolutions of the WTG shaft. In addition, according to the tenth aspect of the invention, an AEV as set forth in the first aspect of the invention, the CCU is operable to distribute the necessary voltages to the DC motors.

According to the construction, the CCU serves as the main hub as well as the source for accepting and receiving power from the WTG and or the DC motors as well as the batteries (RESS).

In addition to the eleventh aspect of the invention, a AEV as set forth in the first aspect of the invention. When the WTG is not able to supply adequate voltage to the CCU the air motor will torque the WTG.

According to the construction, the system is designed such that in driving situations where the velocity of the WTG is not maximized the power output is affected since power out is a function of wind velocity. The air motor that is powered by the pressure filled air tank will torque the WTG. As the WTG gets torque; the generated energy will duplicate the condition when the vehicle is moving freely in traffic. This artificial source of wind speed will restore the charge to the batteries. The batteries can be coupled or used individually to provide the necessary power that is absent from the WTG due to lack of air flow.

In addition, according to the twelfth aspect of the invention, an AEV as set forth in the eleventh aspect of the invention, wherein if the air flow is minimum the WTG will supply the necessary voltage for DC motor number one while simultaneously charge RESS. The air motor will torque the WTG; therefore the voltage will be available to power DC motor number two if additional torque and or acceleration is needed.

According to the construction, the system is designed to function from the WTG as well as the RESS powering an air compressor which powers an air motor that torques the WTG. The above and still further objects, features and advantages of the present invention will become apparent upon consideration of the following detailed description of a specific embodiment thereof, especially when taken in conjunction with the accompanying drawings, wherein like reference numerals in the various figures are utilized to designate like components.

Table 1 shows a chart that displays the two modes of operation and the module that will become enabled.

DESCRIPTION OF THE PREFERRED EMBODIMENTS

Figure 1:
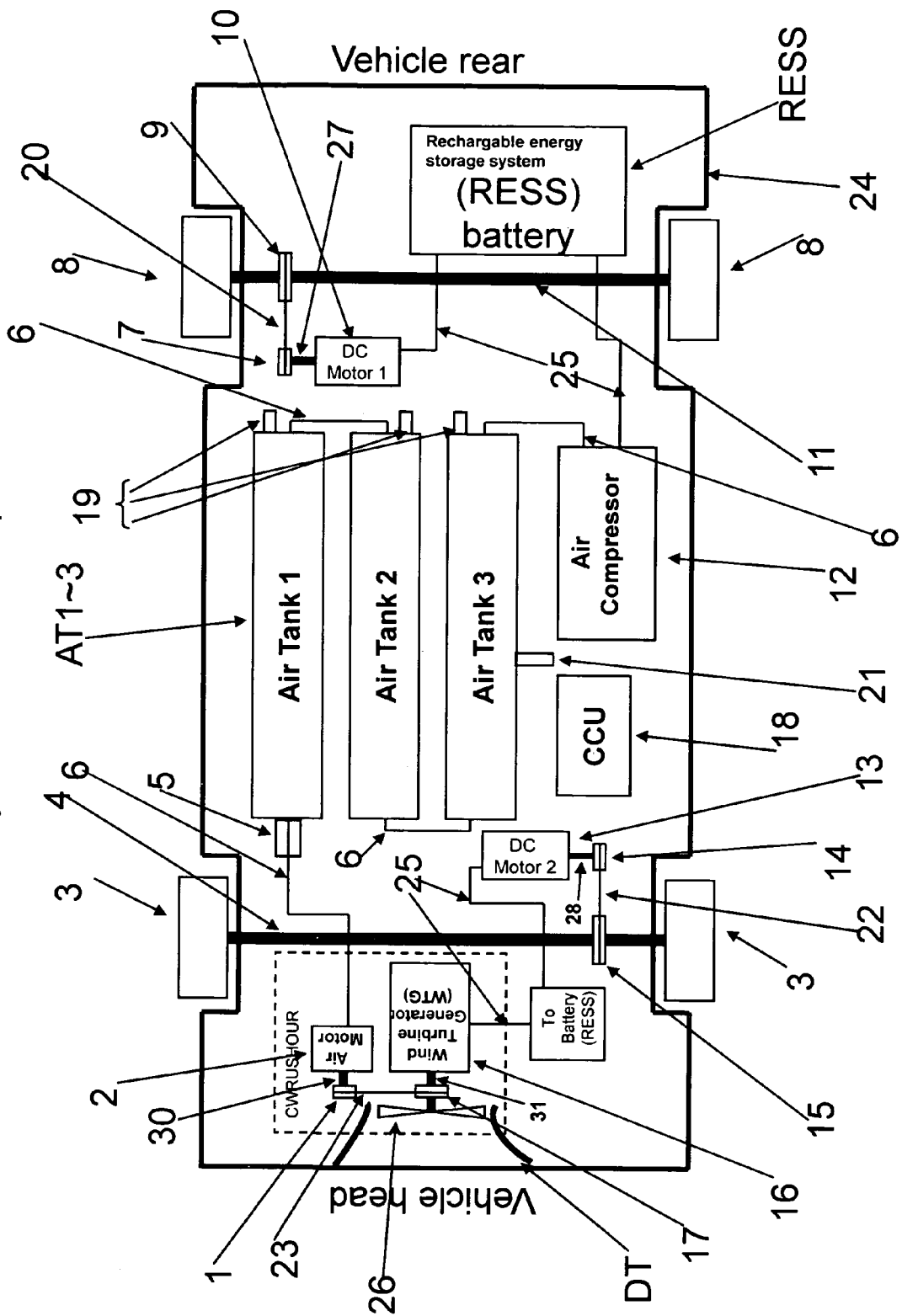
FIG. 1 is a block diagram showing an overall configuration of the Wind Turbine Generator All Electric Vehicle (WTGAEV) according to the first embodiment.
Figure 2:
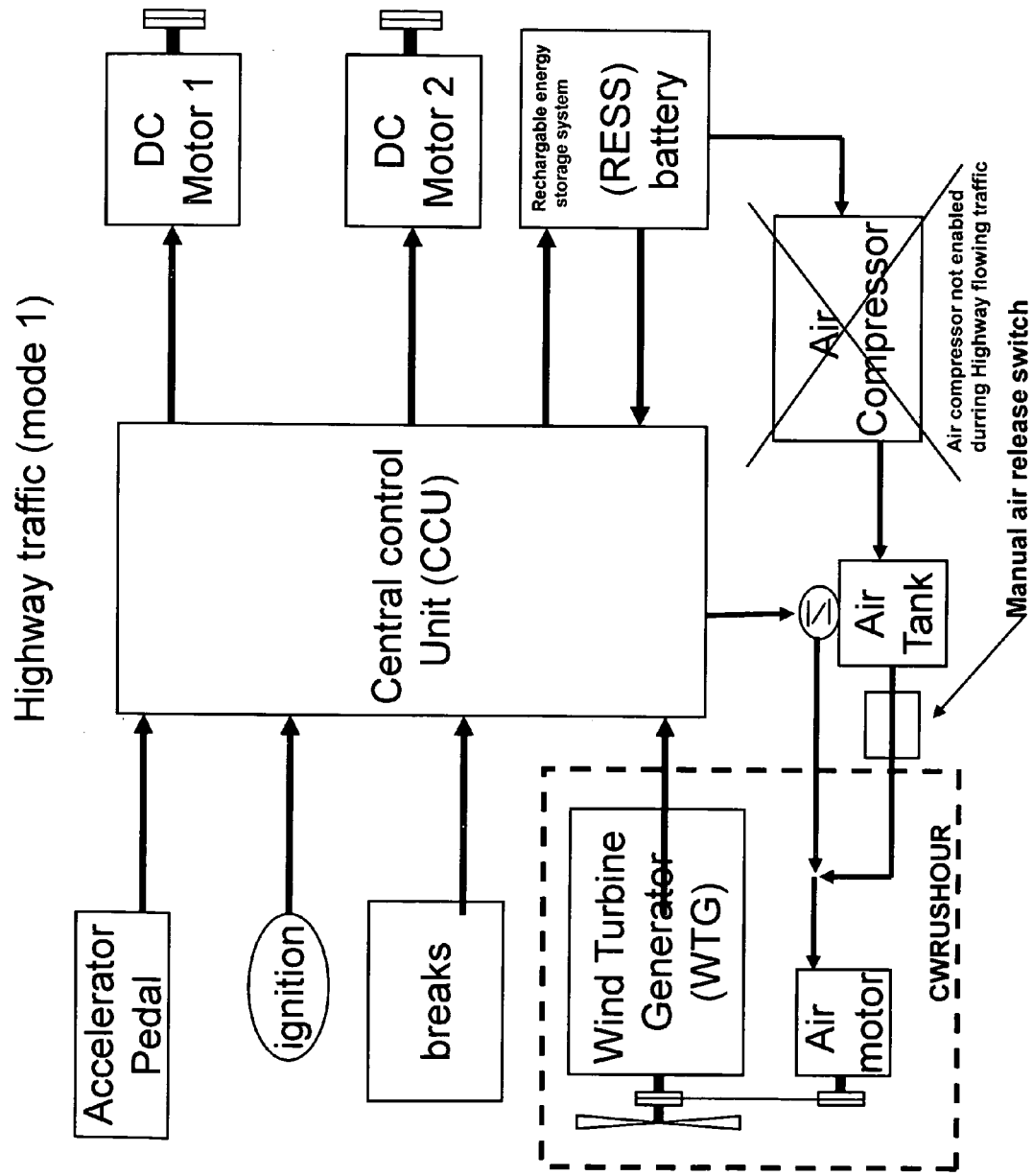
FIG. 2 is a diagram showing a control system consisting of the central control unit feeding and receiving voltages and currents from and to the external modules. This diagram depicts the functional conditions of the first mode of this vehicle operation which is highway traffic.
Figure 3:
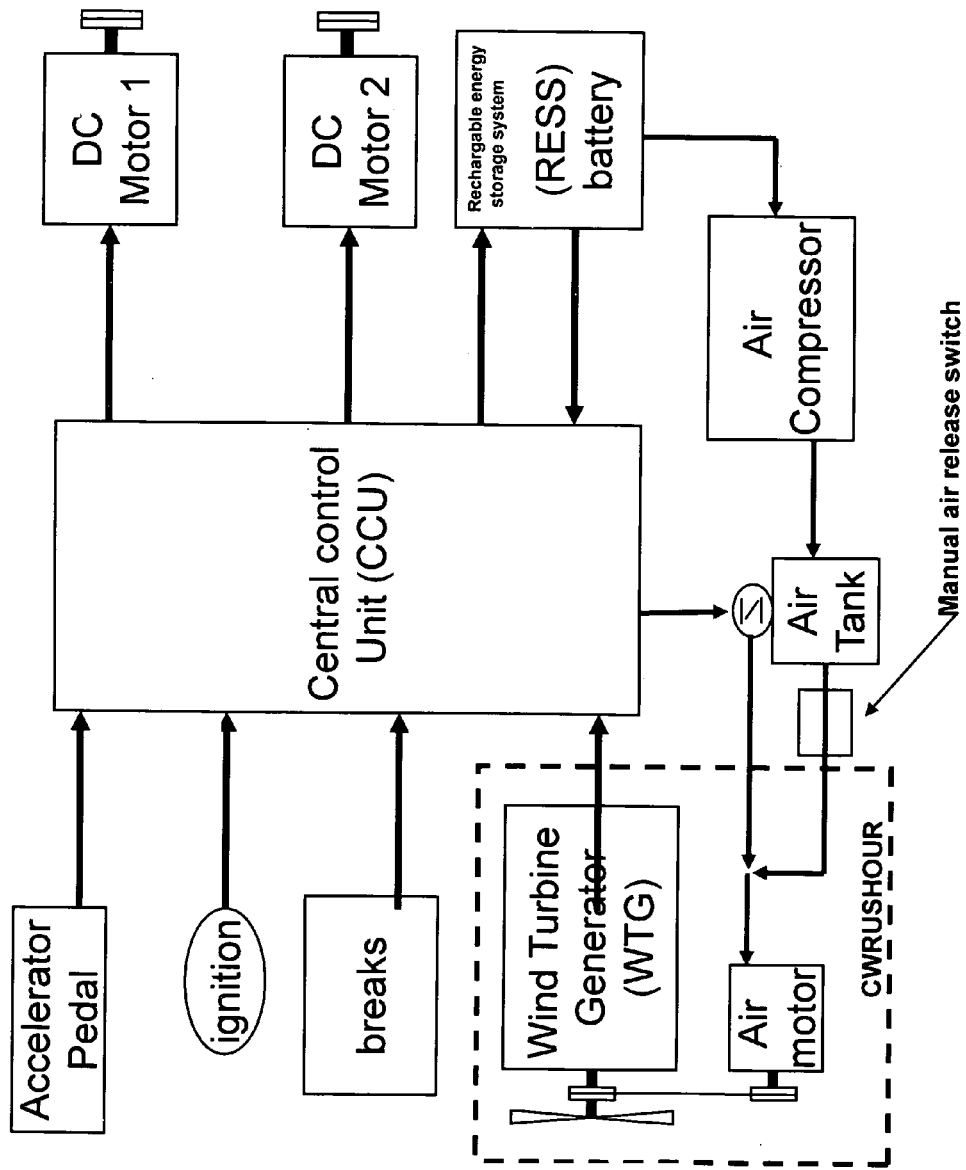
FIG. 3 is a diagram showing the control systems involved when this vehicle is automatically switched into the second mode of operation which is rush hour traffic or stop start city driving.
Figure 4:
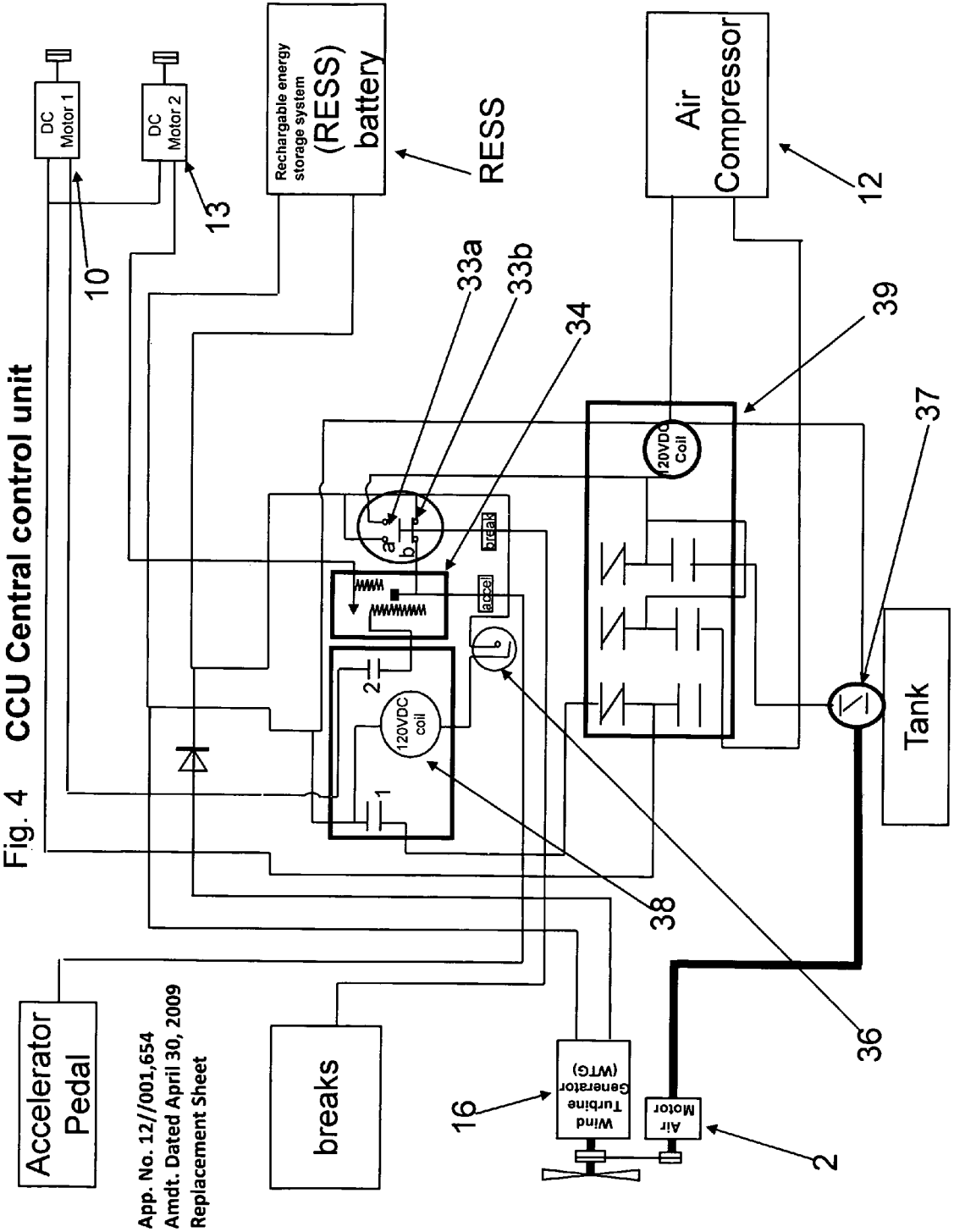
FIG. 4 is a diagram showing the electrical configuration of the central control unit CCU that is responsible for controlling the first and second modes of operation.
Figure 5:
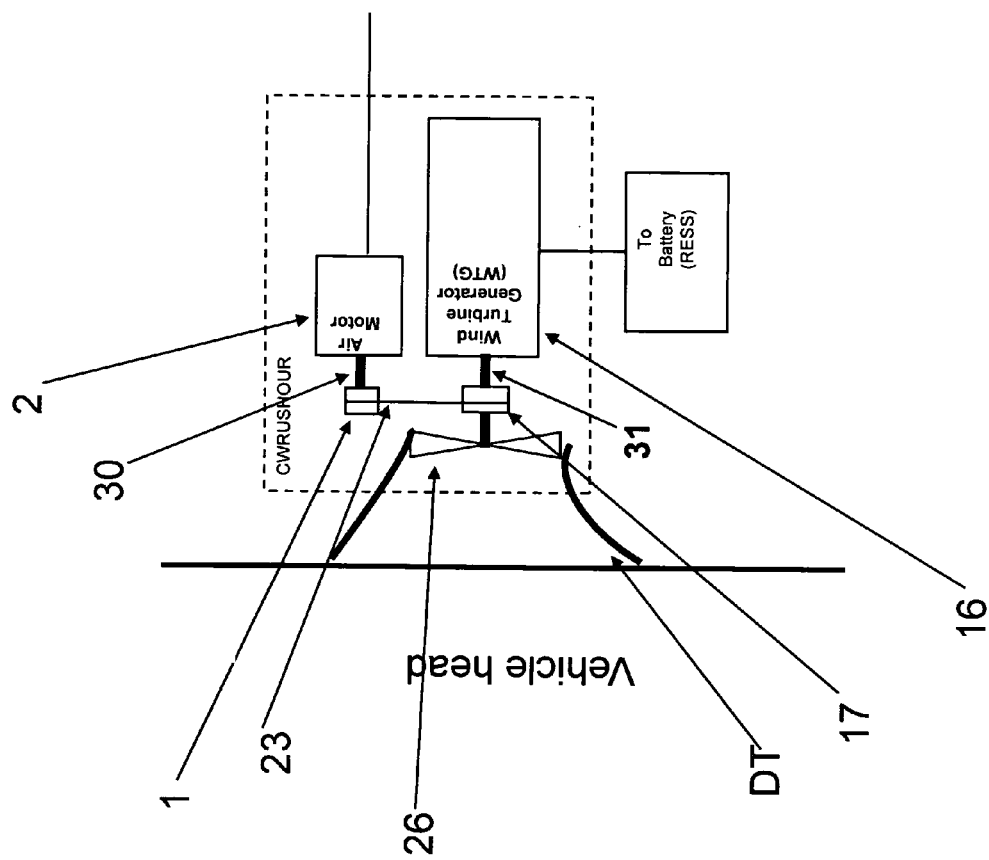
FIG. 5 is a diagram showing the duct with the wind turbine generator air motor assembly.
Figure 6:
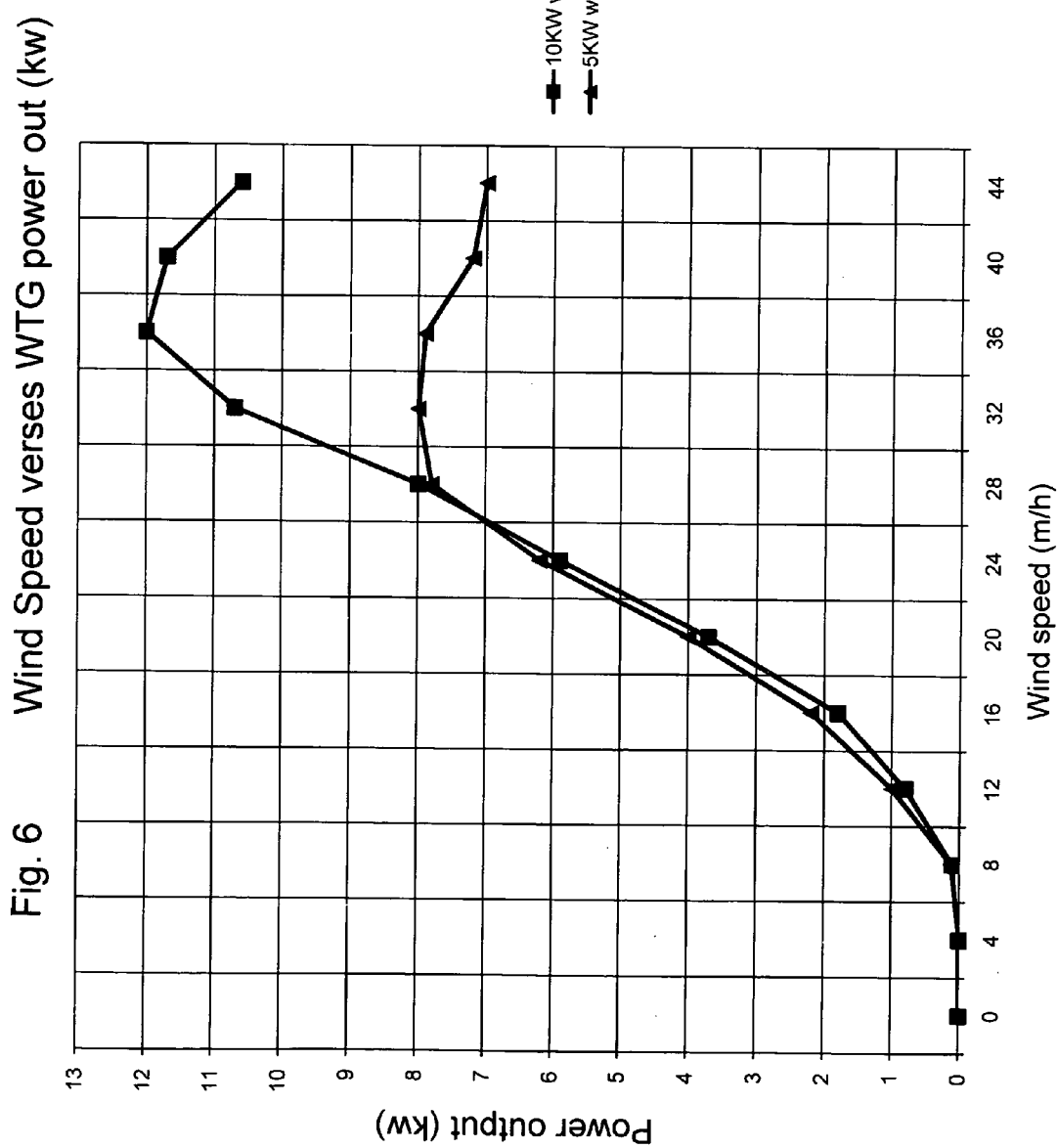
FIG. 6 is a diagram showing the performance curves of the wind turbine generator for a 5 kw and 10 kw wind turbines.

A mode for carrying out the invention will be described below based on embodiments of the invention illustrated in the accompanying drawings. FIGS. 1-5 show first embodiment of the invention. FIG. 1 is a diagram showing the overall configuration of this Wind Turbine Generator Air Electric Vehicle (WTGAEV). FIG. 2 is a diagram showing a control system consisting of the central control unit CCU feeding and receiving voltages and currents from and to the external modules. This diagram depicts the functional conditions of the first mode of this vehicle operation which is highway traffic. FIG. 3 is a diagram showing the control systems involved when this vehicle is automatically switched into the second mode of operation which is rush hour traffic or stop start city driving. FIG. 4 is a diagram showing the electrical configuration of the central control unit that is responsible for controlling the first and second modes of operation. FIG. 5 is a diagram showing the air deflector with the wind turbine generator air motor assembly. FIG. 6 is a diagram showing the performance curves of the wind turbine generator. As shown in FIG. 1 the WTGAEV, 24 has left and right rear wheels, 8 which are the primary driving wheels and left and right front wheels, 3 that are the secondary driving wheels. The primary driving are driven by the DC motor, 10. The motor 10 drives the rear wheels, 8 by a gear, 9 that is fixed to the rear axle, 11. 11 is belt driven by a gear, 7 that is fixed to the shaft, 27 of motor, and 10. The secondary driving wheels, 3 are enabled when the accelerator, 34 in FIG. 4 is depressed and the rheostat varies the voltage of the circuit supplying the DC motors 10 and 13. The secondary front driving wheels, 3 are driven by the DC motor, 13. The motor, 13 drives the front wheels, 3 by a gear, 15 that is fixed to the front axle, 4. 4 is belt, 22 driven by a gear, 14 that is fixed to the shaft, 28 of motor, and 13. Moreover, this drive-train that consists of the gears, 9, 7, 14, and 15 connected to the front and rear axles, 11, 4 and shafts, 27, 28 of the motors, 10 and 13 are not limited to those used in these embodiments. The DC motors 10 and 13 that are responsible for supplying the torque to the front and rear wheels, 3, 8 of this WTGAEV, 24 can be changed to function like an axle—differential pair accordingly. Upon the initial drive of the WTGAEV, 24 the DC motors 10 and 13 will demand power from the Rechargeable Energy Storage System (RESS), —battery. The RESS will be supplied with a maximum charge necessary to drive the vehicle. If this vehicle is a new sale the RESS will have a maximum charge that is filled by the manufacturer. If this vehicle is a used sale the RESS will be fully charged from previously driving. If this vehicle is left idle for an undetermined amount of time and the RESS is depleted, there are two options to make the vehicle drivable. The first option is to open the manual air release valve, 5. The manual air release valve, 5 will supply air thought the high pressure line, 6 to the air motor, 2. The air from the air tanks, AT1~3 will allow the air motor, 2 to torque the WTG, 16. The gear, 1 would pull the belt, 23 which in turn will torque gear, 17 connected to the shaft, 31 of the WTG, 16. As a result energy is generated. This generated energy will drive the DC motor, 10 which will torque the shaft, 27 connected to the gear, 7. Gear, 7 will pull the belt, 20 which in turn pulls the gear 9. Gear 9, will torque the rear axle, 11. The rear axle, 11 torques the rear wheels, 8. The second option to make the vehicle, 24 drivable is to fill the air tanks, AT1~3 through an air intake valve, 21. As the air in the tanks, AT1~3 reaches a particular pressure, the manual air release valve, 5 can be released as the air motor, 2 cycles. At this point the procedure in option one is repeated. In the latter, it is mentioned that the RESS will maintain the necessary voltage level from driving the vehicle. As shown in FIG. 1 the Wind Turbine Generator WTG, 16 is responsible for providing a portion of voltage to the RESS while supplying the reminder of the voltage to the DC motors 10 and 13. The WTG, 16 will supply a varying DC voltage to the RESS and DC motors, 10, 13 as long as the vehicle is in motion such as highway traffic, mode 1. FIG. 2 shows a functional Block diagram of the modules that will interact and be controlled by the CCU. When the vehicle is driven in mode 1 traffic conditions the vehicle needs to maintain a velocity of 10~15 mph to rely on the WTG, 16 for power. When additional power is requested the RESS can fill in the absence of power. This velocity will correspond to a wind speed of approx. 9 m/s that the WTG, 16 will use to generate the necessary voltage to supply the DC motors 10, 13, and the RESS. This corresponds to the WTG, 16 generating 500 Watt to 1 Kwatt of power according to the performance charts in FIG. 6. When the vehicle accelerates the WTG, 16 generates more power. Motor 2, 13 can rely on this energy boost to demand more current when passing other vehicles. The second mode of driving control is if the vehicle is driven in rush-hour traffic. FIG. 3 shows a functional block diagram of the modules that are present and will interact and be controlled by the CCU. In rush hour driving conditions the traffic typically starts and stops. Mode2 power-train control is automatically enabled when the vehicle is stopped. When the vehicle is stopped the air compressor, 12 as shown in FIG. 3 will cycle on. The pressure solenoid, 32 becomes energized from the break depression contact, 33 in FIG. 4 and the Air compressor, 35 from FIG. 3 becomes energized. The solenoid, 32 releases air to the air motor, 2. The shaft, 30 from FIG. 1. Will be connected to a gear 1. 1 will drive the WTG, 16 through a belt, 23 systems. The gear G6 is fixed to the shaft of the WTG, 16. The gears, 1 and 17 are connected through a belt, 23. The air motor, 2 driving the WTG, 16 duplicates the situation of the vehicle in mode 1 traffic; continuous air flow to the propeller blades 26, FIG. 1. As a result the WTG, 16 generates sufficient power to charge the RESS as well as drive the DC motors 10 and 13. As the vehicle resumes to mode1 traffic conditions the chain of events renews.

A typical operation of the CCU is discussed using FIG. 4. Ignition switch, 36 is closed. Relay, 38 closes contacts 1 &2. Rheostat, 34 sends an incremented voltage to DC motor 1, 10. If rheostat, 34 is further depressed motor 2, 13 is starting with an incremented voltage such that motors 10, 13 are energized at the same time. As the vehicle comes to a complete stop, break switch, 33b becomes open, 33a closes. Contact 39D opens which disengages the DC motors 1 &2, 10, 13. As 33a closes, coil 39 becomes energized, therefore contacts 39B, 39C close. Contact 39D opens. Air compressor, 12 powers on. Solenoid 37 opens such that air will flow from the air tank to the air motor, 2. Air motor, 2 drives WTG 16 to restore energy to the RESS.

TABLE 1

| driving conditions | battery enabled? | Air compressor enabled? | Air motor enabled? | DC Motor enabled? | Wind Turbine generator (WTG) enabled? |
|---|---|---|---|---|---|
| Mode 1 Highway traffic (no congestion) | no | no | no | yes | yes |
| Mode 2 Rush Hour (congestion) | yes | yes | yes | yes | yes |

The invention claimed is:

1. An Air Electric vehicle comprising:
one or more wheels; a first dc electric motor operable to propel the Air Electric Vehicle by providing torque to one or more wheels; a second dc electric motor operable to propel the Air Electric Vehicle by providing additional torque to one or more wheels; a first internal storage battery operable to supply power to the first and second direct current (DC) electric motor; a second internal battery operable to supply power to the first storage battery; a Rechargeable Electrical Storage System (RESS) that consists of the first internal battery connected to the second internal battery in parallel; an internal wind turbine generator operable to supply charging voltage a second internal storage battery; a propeller fixed to the shaft of the internal wind turbine generator; an internal air duct connected to the air electric vehicle in a fixed position in front of the propeller of the internal wind turbine generator, operable to deflect air towards the propeller while the vehicle is traveling forward in motion; an internal belt and pulley system (BPS) that consists of two or more pulleys or gears in common to a belt or chain; an internal air motor operable to provide mechanical power to the belt and pulley system; an internal air motor and an internal wind turbine generator are connected to the internal belt and pulley system (BPS); the shaft of the air motor is connected to the first gear or first pulley of the BPS; the shaft of the wind turbine generator is connected to the second gear or second pulley of the BPS in which both gears or both pulley are common to a belt or chain within the BPS; one or more air tanks connected in series operable to: store compressed air, and supply compressed air to the air motor; an air release valve connected to the inlet of the air motor operable to release a controlled amount of compressed air from the air tank or air tanks to the air motor; an internal air compressor that accepts power from the first battery; and supplies compressed air into the air tank or air tanks; one or more air hoses that connects the outlet of the air compressor to the inlet of the air tank; one or more hoses that connects the outlets of one or more air tanks to the inlet of the air release value; a hose to connect the outlet of the air release valve to the inlet of the air motor; an accelerator-pedal connected to the air electric vehicle which consists of a variable resistor operable to control the speed of the first and second DC electric motors by adjusting the current to the first DC electric motor and adjusting the current to a second DC electric motor; a break-pedal connected to the air electric vehicle operable to discontinue current to the first and second DC electric motor; a controller that serves as the Central Control Unit (CCU), operable to: control the electrical power from the first and second batteries, control the mechanical power between the air compressor, air motor, wind turbine generator, control the speed of the first and second dc electric motors; control the current that passes thru the accelerator-pedal, and control the voltage level applied to the DC electric motors.

2. The Air Electric Vehicle of claim 1, whereas the Central Control Unit (CCU) is operable to:
monitor and control power supplied to the first DC electric motor, monitor and control the power supplied to the second DC motor.

3. The Air Electric Vehicle of claim 1, whereas the first internal battery will supply power through the accelerator-pedal to the first and second DC electric motors.

4. The Air Electric Vehicle of claim 3, whereas the velocity of the Air Electric vehicle is controlled by an accelerator-pedal in which the current that passes through the accelerator-pedal is monitored by the central control unit which redistributes voltage to the DC electric motors.

5. The Air Electric Vehicle of claim 1, whereas the break-pedal discontinues the current between the Rechargeable Electrical Storage System (RESS) and the DC electric motors.

6. The Air Electric Vehicle of claim 1, whereas when the vehicle is in forward motion, the internal air duct will deflect air toward the propeller of the wind turbine generator; in which the wind turbine generator shaft will rotate to convert mechanical energy to electrical energy operable to supply a voltage to charge the second battery of the Rechargeable Electrical Storage system (RESS).

7. The Air Electric Vehicle of claim 6, whereas the Central Control Unit (CCU) is operable to: distribute the power from the Wind Turbine Generator (WTG); and redistribute power from the maximum charged battery to the DC motors or from the maximum charged battery to the DC motors.

8. The Air Electric Vehicle of claim 6, whereas when the air electric vehicle slows down or comes to a rest and the air that is deflected towards the propeller of the wind turbine generator (WIG) lacks the air pressure required to rotate the shaft of the wind turbine generator in order to transfer mechanical energy into electrical energy; the central control unit is operable to redistribute power from the Rechargeable Electrical Storage System (RESS) to be made available to the DC motors.

9. The Air Electric Vehicle of claim 8, whereas the controller is operable to: monitor the air pressure in the air tanks; power the air compressor to supply compressed air to the air tank, monitor the air pressure in the air tank so the maximum air pressure will rotate the air motor.

10. The Air Electric Vehicle of claim 1, whereas the air tanks are operable to: provide compressed air to the air motor which will convert potential energy in the form of compressed air into mechanical energy; in which the mechanical energy is converted to electrical energy to torque the shaft of the wind turbine generator through the internal pulley system.

11. The Air Electric Vehicle of claim 10, whereas the torque in the internal pulley system produces a torque to the wind turbine generator (WTG) that will provide a continuous voltage charge the second battery of the Rechargeable Electrical Storage system (RESS) will supply charge to the first battery of the Rechargeable Electrical Storage system (RESS) and simultaneously power the first DC motor and second DC motor.

12. The Air Electric Vehicle of claim 11, whereas if the first battery of the Rechargeable Electrical Storage system (RESS) is no longer charged; the Wind Turbine Generator (WIG) will charge the second battery of the Rechargeable Electrical Storage system (RESS) and simultaneously supply power DC electric motors.

* * * * *